United States Patent
Stratton

(10) Patent No.: US 9,228,095 B2
(45) Date of Patent: *Jan. 5, 2016

(54) PHOTOCATALYTICALLY ACTIVE POLYSILOXANE COATING COMPOSITIONS

(71) Applicant: Cristal USA Inc., Hunt Valley, MD (US)

(72) Inventor: John Stratton, Cleethorpes (GB)

(73) Assignee: Cristal USA Inc., Hunt Valley, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,785

(22) Filed: Aug. 15, 2014

(65) Prior Publication Data

US 2014/0357751 A1 Dec. 4, 2014

Related U.S. Application Data

(63) Continuation of application No. 12/948,436, filed on Nov. 17, 2010, now Pat. No. 8,840,718, which is a continuation of application No. 11/582,763, filed on Oct. 18, 2006, now abandoned.

(51) Int. Cl.
| | |
|---|---|
| *C08L 25/06* | (2006.01) |
| *C09D 7/12* | (2006.01) |
| *B82Y 30/00* | (2011.01) |
| *C09C 1/36* | (2006.01) |
| *C09D 5/16* | (2006.01) |
| *C08K 3/22* | (2006.01) |
| *C08L 9/06* | (2006.01) |

(52) U.S. Cl.
CPC ............... *C09D 7/1291* (2013.01); *B82Y 30/00* (2013.01); *C09C 1/3661* (2013.01); *C09D 5/1618* (2013.01); *C09D 5/1687* (2013.01); *C09D 7/125* (2013.01); *C09D 7/1283* (2013.01); *C01P 2004/64* (2013.01); *C01P 2006/12* (2013.01); *C08K 3/22* (2013.01); *C08L 9/06* (2013.01); *C08L 25/06* (2013.01); *C08L 2205/20* (2013.01); *Y10T 428/31612* (2015.04)

(58) Field of Classification Search
CPC .. C09C 1/3661; C09D 5/1687; C09D 5/1618; C09D 7/1291
See application file for complete search history.

(56) References Cited

U.S. PATENT DOCUMENTS

| | | |
|---|---|---|
| 3,767,455 A | 10/1973 | Claridge et al. |
| 4,012,338 A | 3/1977 | Urwin |
| 4,052,223 A | 10/1977 | Howard |
| 4,420,437 A | 12/1983 | Mori et al. |
| 5,562,764 A | 10/1996 | Gonzalez |
| 5,658,841 A | 8/1997 | Tanaka et al. |
| 6,013,372 A | 1/2000 | Hayakawa et al. |
| 6,103,363 A | 8/2000 | Biore et al. |
| 6,133,342 A | 10/2000 | Mizobuchi et al. |
| 6,228,480 B1 | 5/2001 | Kimura et al. |
| 6,342,099 B1 | 1/2002 | Hiew et al. |
| 6,627,336 B1 | 9/2003 | Ohmori et al. |
| 6,673,433 B1 | 1/2004 | Saeki et al. |
| 6,695,906 B2 | 2/2004 | Hiew et al. |
| 6,824,826 B1 | 11/2004 | Amadelli |
| 6,852,306 B2 | 2/2005 | Subramanian et al. |
| 2003/0082367 A1 | 5/2003 | Talpaert et al. |
| 2003/0143437 A1 | 7/2003 | Ohtsu et al. |
| 2004/0197254 A1 | 10/2004 | Toki et al. |
| 2004/0241502 A1 | 12/2004 | Chung et al. |
| 2005/0075562 A1 | 4/2005 | Szakelyhidi, Jr. et al. |
| 2006/0046056 A1 | 3/2006 | Brown et al. |
| 2006/0070551 A1 | 4/2006 | Kanamori et al. |
| 2006/0116282 A1 | 6/2006 | Honda et al. |
| 2007/0213459 A1 | 9/2007 | Tamai et al. |

FOREIGN PATENT DOCUMENTS

| | | |
|---|---|---|
| DE | 19858933 | 6/2000 |
| EP | 0590477 | 4/1994 |
| EP | 901991 | 3/1999 |
| EP | 923988 | 6/1999 |
| EP | 1074525 | 2/2001 |
| EP | 1118385 | 7/2001 |
| EP | 1158028 | 11/2001 |
| FR | 2776944 | 10/1999 |
| FR | 2838735 | 7/2003 |
| JP | 10180118 | 7/1998 |
| JP | 10212809 | 8/1998 |
| WO | 9404603 | 3/1994 |
| WO | 9707069 | 2/1997 |
| WO | 9710186 | 3/1997 |
| WO | 9841480 | 9/1998 |
| WO | 2005075562 | 8/2005 |
| WO | 2005082810 | 9/2005 |
| WO | 2005083013 | 9/2005 |
| WO | 2005083014 | 9/2005 |
| WO | 2006030250 | 3/2006 |
| WO | 2004018579 | 4/2006 |

OTHER PUBLICATIONS

Allen et al., "Photocatalytic Coatings for Environmental Applications", Photochemistry and Photobiology, (2005) vol. 81, pp. 279-290.

(Continued)

*Primary Examiner* — Pegah Parvini
(74) *Attorney, Agent, or Firm* — Greenberg Traurig; Jonathan D. Ball

(57) ABSTRACT

The invention is a coating composition comprising photocatalytic titanium dioxide particles, an opacifying agent, a silicone compound, de-$HNO_3$ particles, styrene resin hollow microspheres, and a solvent. The combination of a silicone compound and styrene resin hollow microspheres in a depolluting coating composition results in improved opacity and durability compared to conventional coatings.

3 Claims, No Drawings

(56) References Cited

OTHER PUBLICATIONS

Maltby et al., U.S. Appl. No. 11/848,972, filed Aug. 31, 2007, entitled Photocatalytic Coating.

Heydenrych, Amy; "New Opague Polymer Technology Launched," Engineering News (Mar. 24, 2006).
European Search Report issued in corresponding EP Application No. 07853635, mailed Oct. 18, 2010.
Singapore Written Opinion and Search Report issued in corresponding SG Application No. 200901944-9, mailed May 6, 2010.

PHOTOCATALYTICALLY ACTIVE POLYSILOXANE COATING COMPOSITIONS

CROSS REFERENCE TO RELATED APPLICATIONS

The present application is a continuation of U.S. Ser. No. 12/948,436, filed Nov. 17, 2010, which is a continuation of U.S. Ser. No. 11/582,763, filed Oct. 18, 2006. The entire contents of the above-referenced parent applications are hereby expressly incorporated herein by reference.

FIELD OF THE INVENTION

This invention relates to an improved coating composition useful for the formation of a depolluting and/or antifouling coating on the surface of a substrate.

BACKGROUND OF THE INVENTION

Conventional methods for making the surface of materials soil cleaning comprises treating the surface to confer the ability to remove stains or soils deposited on the surface. In other methods, excellent oxidative degradation activity of a photocatalyst fixed onto the surface is utilized to degrade organic matter or stains or soils deposited on the surface and also any gaseous pollution which comes into contact with the surface.

In particular, heterogeneous photocatalysis has efficiently been used for oxidizing and thereby removing unwanted compounds from fluids, including water, and air. Thus, UV-illuminated catalyst, such as titanium dioxide, absorbs UV light, which produces electrons and holes that migrate to the surface of the catalyst. At the surface, the electrons reduce adsorbed oxygen, while the holes oxidize organic compounds or adsorbed water molecules.

However, satisfactory depolluting properties may not be provided with only such a single photocatalytic coating composition for a long lifetime i. e. over 5 years.

Accordingly, it is an object of the present invention to provide a coating composition which, independently of environment, such as indoor or outdoor environment, can semi-permanently and in a single coating exhibits excellent surface depolluting properties, particularly excellent soil cleaning activity against greasy stains, including mildew, mold, algae or soils.

For various reasons, including cost and desired properties, there is always a need to develop new and better depolluting coating compositions.

SUMMARY OF THE INVENTION

The invention is a coating composition comprising photocatalytic titanium dioxide particles, an opacifying agent, a silicone compound, de-HNO3 particles, styrene resin hollow microspheres, and a solvent. The coating compositions demonstrate unexpectedly improved opacity and durability compared to coatings that do not contain a combination of a silicone compound and styrene resin hollow microspheres.

DETAILED DESCRIPTION OF THE INVENTION

The coating composition of the invention comprises photocatalytic titanium dioxide particles. In the present invention, the term "photocatalytic titanium dioxide particles" as used herein refers to titanium dioxide particles which, when exposed to light of any wavelength, can cause excitation (photoexcitation) of electrons in the valence band to produce conduction band electrons and leaving holes in the valence band.

The photocatalytic titanium dioxide particles may be any type of titanium dioxide. Preferably, the photocatalytic titanium dioxide particles are anatase, rutile or mixtures thereof. Most preferably, the photocatalytic titanium dioxide particles are predominantly anatase, as determined by X-ray diffraction patterns. By predominantly anatase, it is meant that the nanoparticles are at least 80 percent anatase, and most preferably greater than 95 percent anatase. The anatase form of titanium dioxide is especially preferred for its higher photoactivity. The photocatalytic titanium dioxide particles may be preferably modified by the addition of other elements from the periodic table to enhance photoactivity at longer wavelengths and into the visible part of the spectrum.

The crystalline anatase titanium dioxide particles preferably have a mean particle size of between 2 and 100 nm, more preferably between 5 and 50 nm, and most preferably between 5 and 40 nm. The diameters may be measured by transmission electron microscopy (TEM) and also X-ray diffraction (XRD).

Preferably, the photocatalytic particles have a high surface area of greater than 30 $m^2/g$, more preferably above 50 $m^2/g$, and most preferably greater than about 100 $m^2/g$, as measured by the BET method.

Suitable photocatalytic titanium dioxide particles may be purchased from Millennium Inorganic Chemicals Ltd. (PC series of products), Degussa Corporation (e.g., Aeroxide® P25), Sachtleben Chemie GmbH (e.g., Hombikat UV100), Tayca Corporation (e.g., AMT-600), or Ishihara Corporation (ST series of products). The photocatalytic titanium dioxide particles may also be prepared by any process known in the art. Processes for preparing photocatalytic titanium dioxide particles are well known in the art. See, for example, U.S. Pat. No. 4,012,338, which is incorporated herein by reference.

The photocatalytic titanium dioxide particles are preferably present in an amount of from 0.5 to 20%, more preferably 1 to 15%, and most preferably 1 to 12%, by weight of total weight of the composition.

The photocatalytic titanium oxide particles may be introduced in the composition as a sol prepared by dispersion in a dispersant, as a water- or solvent-containing paste, or as a powder. Preferred examples of the dispersant used to prepare a sol include water, alcohols such as methanol, ethanol, isopropanol, n-butanol and isobutanol, and ketones such as methyl ethyl ketone and methyl isobutyl ketone.

The coating composition of the invention also comprises an opacifying agent. The opacifying agent suitable for the invention includes any organic or inorganic compound that is able to provide hiding power to the coating, including pigments, colorants and/or fillers. More preferably, the opacifying agent is titanium dioxide. Pigmentary titanium dioxide preferably has a particle size in the range of from 0.2 to 0.5 μm, thus is significantly larger in particle size compared to the photocatalytic titanium dioxide particles. Titanium dioxide pigments which have had their photoactivity reduced by surface treatment are disclosed in, for example, U.S. Pat. No. 6,342,099. Suitable commercially available titanium dioxide pigment includes Tiona® 595 (a product of Millennium Inorganic Chemicals Ltd.) or any pigmentary titanium dioxide recommended for applications in latex or emulsion paints.

The pigmentary titanium dioxide may be untreated titanium dioxide. However, it is preferably a coated titanium dioxide that has been treated with at least one inorganic oxide coating, such as aluminum oxide, silicon dioxide, zirconium oxide, and the like. Processes to deposit metal oxides onto a titanium dioxide are well known to those skilled in the art. Preferably, the metal oxides are added by wet treatment or by gas-phase deposition. Suitable wet treatment techniques are taught in U.S. Pat. Nos. 3,767,455, 4,052,223, and 6,695,906, the teachings of which are incorporated herein by reference. Suitable gas-phase deposition techniques are taught in U.S. Pat. Nos. 5,562,764 and 6,852,306, the teachings of which are incorporated herein by reference.

A silicon dioxide coating on the surface of the pigmentary titanium dioxide is formed by the addition of a silica compound. Suitable silica compounds include water soluble alkali metal silicates; Preferred alkali metal silicates include sodium silicate, potassium silicate and the like. Most preferably, the silica compound is sodium silicate. A zirconium dioxide coating is formed by the addition of a zirconia compound. Zirconia compounds suitable for use in the present invention include the acidic salts of zirconia such as zirconium oxychloride, zirconyl sulphate and the like. Most preferably, the zirconia compound is zirconium oxychloride or zirconyl sulphate. Similarly hydrous forms of alumina or aluminium hydroxides may be precipitated from salts such as aluminium sulphate or sodium aluminate, typically in the range of 0.5 to 10%.

Additionally, the coated titanium dioxide pigment may be treated with polyalcohols such as trimethylolethane and trimethyloipropane, alkanolamines such as triethanolamine, phosphates, and mixtures thereof. Preferably, the phosphate compound is formed from a water soluble phosphate compound, such as for example, tetrapotassium pyrophosphate, sodium polyphosphate, tetrasodium pyrophosphate (Tetron), sodium tripolyphosphate, potassium tripolyphosphate, sodium hexametaphosphate (Calgon), phosphoric acid, and the like. Most preferably, the water soluble phosphate compound is sodium hexametaphosphate.

In one example, the titanium dioxide may first be treated with the deposition of a phosphate compound to form a contiguous layer on the base TiO$_2$, followed by the deposition of a dense silica compound contiguous with the phosphate deposit, optionally a second deposition of a phosphate compound contiguous with the dense silica compound, and finally the deposition of an alumina compound. Alternatively, the titanium dioxide may be coated with a zirconia compound instead of the silica compound.

The weight percent of phosphate can vary depending on the layer deposited on the titanium dioxide base. If the phosphate is deposited as the first layer on the titanium dioxide, the phosphate is deposited in an amount of from about 0.05% to about 1.0%, more preferably from about 0.05% to about 0.75% and most preferably, from about 0.05% to about 0.5% based upon the weight of titanium dioxide base. The weight percent silica deposited is preferably in an amount of from about 0.5% to about 15% by weight of silica based on the total weight of the titanium dioxide base. Preferably, zirconium dioxide is deposited in an amount of from about 0.1% to about 5.0% by weight of zirconium dioxide based on the total weight of the titanium dioxide base.

The amount of opacifying agent in the coating composition is preferably 0.05 to 25 percent, and more preferably 0.1 to 15 percent, by weight (expressed in dry matter) of the total weight of the coating composition.

The coating composition of the invention also comprises a silicone compound. The silicone compound is any material based on silica or mixture thereof, which is able to provide a silicone based-film convenient for coating. Preferably, the silicone compound includes at least one polysiloxane derivative. Preferred polysiloxanes have the formula:

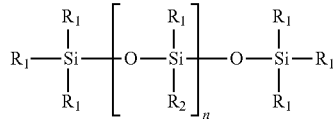

wherein n is from about 10 to 2000, and $R_1$ and $R_2$ are $C_{1-20}$ alkyl or aryl groups. Illustrative $R_1$ and $R_2$ radicals are alkyl groups (e. g., methyl, ethyl, propyl, butyl, 2-ethylbutyl, octyl), cycloaklyl groups (e. g., cyclohexyl, cyclopentyl), alkenyl groups (e. g., vinyl, hexenyl, allyl), aryl groups (e. g., phenyl, tolyl, xylyl, naphthyl, diphenyl) aralkyl groups (e. g., benzyl, phenylethyl), any of the foregoing groups in which some or all of the hydrogens bonded to the carbons have been substituted (such as with halogen atoms or cyano), or groups substituted with or containing, for example, amino groups, ether groups (—O—), carbonyl groups (—CO—), carboxyl groups (—COOH) or sulfonyl groups (—SO$_2$—) (e. g., chloromethyl, trifluoropropyl, 2-cyanoethyl, 3-cyanopropyl).

Suitable polysiloxanes include Silres® BS 45 (a product of WACKER-Chemie GmbH).

The amount of silicone compound in the coating composition is preferably 0.05 to 20 percent, and more preferably 0.1 to 16 percent, by dry weight on the total weight of the coating composition. An organic polymer may be optionally added in addition to the silicone compound. Suitable organic polymers include acrylic polymers, polyvinyl acetates, and styrene-butadienes. Acrylic polymers include the polymers and copolymers of acrylic acid, methacrylic acid, the esters of acrylic acid and methacrylic acid, and acrylonitrile, including styrene-acrylic resins.

The coating composition of the invention also comprises de-HNO$_3$ particles. The de-HNO$_3$ particles are any material that is capable of removing the oxidized species HNO$_3$, formed photocatalytically from NOx.

Suitable de-HNO$_3$ particles include basic compounds, in particular any insoluble carbonates such as calcium carbonate, zinc carbonate, magnesium carbonate and mixtures thereof. Preferably, the de-HNO$_3$ particles include calcium carbonate. The amount of de-HNO$_3$ particles in the coating composition is preferably 0.05 to 40 percent, and more preferably 0.1 to 15 percent, by weight (expressed in dry matter) of the total weight of the coating composition.

The ratio of de-HNO$_3$ particles/photocatalytic particles is preferably from 0.01 to 50, more preferably from 0.1 to 20, and most preferably from 0.2 to 5.

The coating composition of the invention also comprises styrene resin hollow microspheres. The hollow resin microspheres have a cavity inside and typically have an outside diameter of less than 10 µm. Preferably, the microspheres have an outside diameter in a range of from about 0.1 µm to about 2 µm, more preferably from about 0.2 µm to about 1 µm. Suitable styrene resins for the hollow resin microspheres include polystyrene, poly-α-methylstyrene, and styrene-acrylic copolymer resins. Styrene-acrylic copolymer resins are particularly preferred.

Suitable styrene resin hollow microspheres include Ropaque® Ultra-E (a product of Rohm and Haas) and Dow® HS 3000NA.

The amount of styrene resin hollow microspheres in the composition is preferably 0.1% to 20% percent, and more preferably 2 to 15 percent, by weight (expressed in dry matter) of the total weight of the coating composition.

The coating composition of the invention also comprises a solvent. Suitable solvents include water, an organic solvent, and a mixed solvent composed of water and an organic solvent. Water and a high boiling point esters, ethers or diols are particularly preferred, the latter organic solvents being known as coalescents or coalescing solvents.

The coating composition of the invention may optionally comprise other compounds, provided such an addition does not compromise the shelf life, UV durability, or depolluting properties of the resulting coating.

Examples of such additional compounds include filler (s) like quartz, calcite, clay, talc, barite and/or Na—Al-silicate; dispersants like polyphosphates, polyacrylates, phosphonates, naphthene and lignin sulfonates; wetting agents like anionic, cationic, amphoteric and non-ionic surfactants; defoamers like silicon emulsions, hydrocarbons, and long-chain alcohols; stabilizers like mostly cationic compounds; coalescing agents like alkali-stable esters, glycols, hydrocarbons; rheological additives like cellulose derivatives (carboxymethylcellulose CMC, hydroxyethylcellulose HEC), xanthan gum, polyurethane, polyacrylate, modified starch, bentone and other lamellar silicates; water repellents like alkyl siliconates, siloxanes, wax emulsion, fatty acid Li salts and conventional fungicide or biocide.

Of course, none of the additives should be saponifiable or otherwise unstable to the alkalinity of the finished coating (pH values about 7.5 to 10).

A photocatalytically active coated substrate is formed by a process which comprises depositing the coating composition on a substrate material by contacting the surface of the substrate material with the coating composition. The coating composition of the present invention may be applied onto the surface of the substrate material by any suitable method. Examples of suitable methods include spray coating, dip coating, flow coating, spin coating, roll coating, brush coating, and sponge coating.

The coating composition after the application onto the surface of the substrate is then fixed, generally by drying or curing to form an organic/inorganic layer, generally in the form of a thin film. The term "drying or curing" used herein means that the binders contained in the composition, according to the present invention, are converted to a film. Preferably, drying is performed by air drying. Advantageously, the forming of the coating does not require thermal treatment at high temperatures, e.g. 50-450° C. for several hours.

The coating composition of the present invention may be applied on the surface of various substrate materials. Suitable substrate materials include, but are not limited to, metals, ceramics, glasses, woods, stones, cements, concretes, and combinations of the above materials and laminates of the above materials. Specific examples to which the composition may be applied include housing and building materials; exterior of the buildings; interior of the buildings; sashes; glass; structural materials; exterior of machines and articles; dust-proof covers and coatings; and films, sheets and seals.

The following examples merely illustrate the invention. Those skilled in the art will recognize many variations that are within the spirit of the invention and scope of the claims.

EXAMPLE 1

Coating Compositions

Various coating compositions are prepared using the following materials: (a) PC105M photocatalytic titanium dioxide from Millennium Inorganic Chemicals; (b) Tiona® 595 pigmentary titanium dioxide from Millennium Inorganic Chemicals; (c) calcium carbonate—Snowcal 60 from Omya Ltd.; (d) hydroxy ethyl cellulose—Natrosol® 250 MR from Hercules Incorporated; (e) antifoam—Foamaster® NXZ from Cognis Corp.; (f) sodium salt of a polyacrylic acid—Adiprex N40 from Ciba Speciality Chemicals; (g) polysiloxane polymer latex—Silres® BS45 from Wacker Chemie GmbH; (h) styrene-acrylic emulsion polymer—Acronal® 290D from BASF AG; (i) styrene-acrylic resin hollow microspheres—Ropaque® Ultra E from Rohm Haas Company; (j) 2,2,4 trimethyl-1,3 pentanediol monoisobutyrate—Texanol® from Eastman Chemical Company; (k) fungicide—Acticide® SPX from Thor Specialities.

The coatings are prepared using a DIspermat® AE01M high-speed disperser manufactured by VMA Getzmann GMBH. The dispersion is carried out in a 500 mL stainless steel vessel at 3,000 rpm with a 50 mm diameter dispersion impeller.

Foamaster NXZ antifoam and Adiprex N40 are added to an aqueous solution of Natrosol 250MR (3% solution in water) under low speed stirring at 500 rpm. Then, the PC105M, Tiona 595 and Snowcal 60 are added with increasing speed up to 3,000 RPM. The pigments are dispersed for 10 minutes and then the speed is reduced to 1,000 RPM before adding water followed by the Acronal 290D emulsion polymer or the Silres BS45 polysiloxane polymer, Texanol, and Acticide SPX. For paints containing styrene-acrylic resin hollow microspheres, the Ropaque Ultra E is added last. The paint is stirred for a further 5 minutes at 1,000 RPM and then transferred to a suitable sealed container.

The compositions of Coatings 1-8 are shown in Table 1.

Comparative Coating #1 is a 40% pigment volume concentration (PVC) coating containing polysiloxane, but no Ropaque Ultra E styrene resin hollow microspheres. Coating #2 is a 40% PVC coating containing polysiloxane and Ropaque Ultra E.

Comparative Coating #3 is a 60% PVC coating containing polysiloxane, but no Ropaque Ultra E. Coating #4 is a 60% PVC coating containing polysiloxane and Ropaque Ultra E.

Comparative Coating #5 is a 40% PVC coating that contains Arconal 290D (a styrene acrylic latex polymer) in place of the polysiloxane, but does not contain Ropaque Ultra E. Comparative Coating #6 is a 40% PVC coating that contains Arconal 290D in place of the polysiloxane, and also contains Ropaque Ultra E.

Comparative Coating #7 is a 60% PVC coating that contains Arconal 290D in place of the polysiloxane, but does not contain Ropaque Ultra E. Comparative Coating #8 is a 60% PVC coating that contains Arconal 290D in place of the polysiloxane, and also contains Ropaque Ultra E.

EXAMPLE 2

Coating Durability Test

Coatings 1-8 are tested for durability by preparing coatings on stainless steel panels and exposing them to simulated weathering conditions in a weathering machine. The amount of weight that the coating loses during the exposure is a measure of its durability.

The stainless steel panels (75×150 mm; 0.75 mm thick) are weighed to 0.0001 g before and after application of the paint film in order to calculate the weight of the coating. The panels are coated by any convenient means including brushing, spraying, spinning or by spiral rod applicator. Only the surface to be exposed is coated. The dry film thickness is typically in the range of 20 to 50 microns.

The coatings are left to dry for 7 days before exposure in the Weatherometer, an Atlas Ci65A Weather-Ometer® made by Atlas Electric Devices, Chicago. The light source is a 6.5 kW Xenon source emitting 0.5 W/m² UV at 340 nm. The black panel temperature is 63° C., water spray is applied for 18 minutes out of every 120 minutes, and there is no dark cycle. The results are shown in Table 2.

The results demonstrate that coatings based on polysiloxane are more durable than those based on a conventional styrene acrylic polymer (Arconal 290D). It is also shown that the addition of styrene resin hollow microspheres (Ropaque Ultra E) results in much lower percentage weight loss over time for polysiloxane-based coatings as compared to the conventional styrene acrylic polymer-based resins. In fact, Coating #2 at 40% PVC shows a weight loss that is lower than, or at worst equal to, Coating #1 that does not contain styrene resin hollow microspheres.

EXAMPLE 3

Opacity Test

The opacity of Coatings 1-8 is determined by measuring the scattering coefficient (measured in mils⁻¹), Paints films are prepared by drawing down a coating with a spiral wound applicator on Melinex® clear polyester film (having a thickness of 30 to 40 microns) to a dry film thickness of approximately 25 microns. The reflectances of the coating are measured using a Byk-Gardner Color-vIew® spectophotometer, first with the film in contact with a white tile and second in contact with a black tile. Good optical contact is made between the paint film and the tile by applying a coating of a liquid with the same refractive index as the polyester film, such as Shellsol T (a product of Shell Chemicals).

The film thickness of the coating is then determined by cutting out an area of paint film of approximately 15 cm², corresponding to the same area on which the reflectances are determined. The coating plus polyester substrate is then weighed to within 0.1 mg. The coating is then removed from the substrate by immersion and cleaning in acetone and the weight of the polyester film is determined. The difference between the two weights is the weight of the paint film. The film thickness of the coating is determined from its weight, its known area, and the density of the coating. The scattering coefficients are then calculated using Kubela-Monk equations. The results are shown in Table 3.

The results demonstrate that the combination of polysiloxane and styrene resin hollow microspheres unexpectedly results in a significant increase in opacity compared to systems based on the conventional styrene acrylic polymerbased resins.

EXAMPLE 4

DeNOx Test

Coatings 1-4 are tested for their ability to remove NOx by the following procedure. The paint films prepared as in Example 3, are first irradiated with 0.5 W/m² UV at 340 nm for 7 days using a filtered Xenon light source (Atlas Weather-Ometer Ci65A) before carrying out the test. This either activates or increases the activity of the coatings over and above the unexposed coatings.

The $NO_x$ that is used in the tests is NO at 450 ppb in nitrogen mixed with an equal volume of air at 50% humidity to give 225 ppb NO. NOx is measured using a Monitor Europe ML® 9841 Nitrogen Oxides Analyzer. For the $NO_x$ measurements, the samples are irradiated with a UV fluorescent tube which emits 10 W/m² UV in the range of 300-400 nm.

The paint film sample is placed in the test chamber of the nitrogen oxides analyzer and the chamber is sealed. NO test gas is flowed into the test chamber and the initial value of NOx in the chamber is analyzed. The UV lamp is then turned on and the irradiated sample is allowed to reach equilibrium (typically up to 3 minutes) before the final value of NOx in the chamber is analyzed. The % NOx removal is calculated by the (initial value–final value)/initial value*100. The results are shown in Table 4.

The results show that the coatings that contain Ropaque are active toward NOx, although their effectiveness has been reduced compared to coatings that do not contain Ropaque.

TABLE 1

COATING FORMULATIONS

| Component | Coating # | | | | | | | |
|---|---|---|---|---|---|---|---|---|
| | 1* | 2 | 3* | 4 | 5* | 6* | 7* | 8* |
| Tiona ® 595 (wt. %) | 14.58 | 10.29 | 12.62 | 8.91 | 14.58 | 10.29 | 12.62 | 8.91 |
| PC 105 (wt. %) | 9.71 | 6.85 | 8.42 | 5.94 | 9.71 | 6.85 | 8.42 | 5.94 |
| Snowcal60 (wt. %) | 9.84 | 6.95 | 19.88 | 14.03 | 9.84 | 6.95 | 19.88 | 14.03 |
| 3% Natrosol 250MR (wt. %) | −16.63 | 11.74 | 16.67 | 11.76 | 16.63 | 11.74 | 16.67 | 11.76 |
| Adiprex N40 (wt. %) | 0.7 | 0.5 | 0.61 | 0.43 | 0.7 | 0.5 | 0.61 | .43 |
| Ropaque (wt. %) | — | 29.42 | — | 29.42 | — | 29.42 | — | 29.42 |
| Polymer¹ (wt. %) | 31.49 | 22.23 | 18.17 | 12.83 | 31.49 | 22.23 | 18.17 | 12.83 |
| Texanol (wt. %) | 1.57 | 1.11 | .91 | .64 | 1.57 | 1.11 | .91 | .64 |
| Water (wt. %) | 15.29 | 10.93 | 22.52 | 15.84 | 15.29 | 10.93 | 22.52 | 15.84 |
| Acticide (wt. %) | 0.2 | 0.2 | 0.2 | .02 | 0.2 | 0.2 | 0.2 | .02 |

*Comparative Example
¹Polymer is polysiloxane polymer latex (Silres BS45) for coatings 1, 2, 3, & 4 and styrene-acrylic emulsion polymer (Acronal 290D) for coatings 5, 6, 7 & 9.

TABLE 2

DURABILITY RESULTS

| | Weight Loss (%) at time | | | | | |
|---|---|---|---|---|---|---|
| Coating | 580 h | 1096 h | 2051 h | 4040 h | 6072 h | 7981 h |
| 1* | 12.3 | 13.2 | 14.2 | 15.7 | 16.7 | 17.4 |
| 2 | 6.8 | 8.4 | 10.1 | 14 | 16.1 | 18.2 |
| 3* | 8.5 | 10.4 | 14 | 21.3 | 28.6 | 38.7 |
| 4 | 7.3 | 11.5 | 17.1 | 42.1 | 80.4 | >100 |
| 5* | 20.4 | 30.8 | 40.9 | 64.3 | >100 | >100 |
| 6* | 22.7 | 34.1 | 46 | 80.7 | >100 | >100 |
| 7* | 28.4 | 40.6 | 50.4 | 77.5 | >100 | >100 |
| 8* | 37 | 53.6 | 71.7 | >100 | >100 | >100 |

*Comparative Example

TABLE 3

OPACITY RESULTS

| Coating | Scattering Coefficient (mil⁻¹) |
|---|---|
| 1* | 5.7 |
| 2 | 11.1 |
| 3* | 7.9 |
| 4 | 11.2 |

TABLE 3-continued

OPACITY RESULTS

| Coating | Scattering Coefficient (mil$^{-1}$) |
|---|---|
| 5* | 4.1 |
| 6* | 4.6 |
| 7* | 3.9 |
| 8* | 9.6 |

*Comparative Example

TABLE 4

DeNOx RESULTS - Percentage Reduction in NO

| Coating | 7-Day Atlas Exposure |
|---|---|
| 1* | 44.6 |
| 2 | 8.8 |
| 3* | 85.5 |
| 4 | 45.6 |

*Comparative Example

The invention claimed is:

1. In a photocatalytically active polysiloxane composition for coating a substrate comprising:
 (a) from 0.5% to 20% by weight, based on the total weight of the composition, of photocatalytic titanium dioxide particles having a mean particle size between 2 nm and 100 nm;
 (b) from 0.05% to 40% by weight of calcium carbonate particles, wherein the ratio of calcium carbonate particles to photocatalytic titanium dioxide particles is from 0.01 to 50; and
 (c) a solvent selected from water, an organic solvent or a mixed solvent consisting of water and an organic solvent, the improvement comprising incorporating into said polysiloxane composition from 0.1% to 20% by weight (expressed in dry matter), based on the total weight of the composition, of hollow styrene resin microspheres having an outside diameter of from 0.1 µm to 10 µm whereby
  (i) the opacity of a dry film coating formed from said polysiloxane composition is greater than the opacity of a dry film coating formed from the same polysiloxane composition that does not include said hollow styrene resin microspheres, and
  (ii) percent weight loss of said dry film coating over a defined time period is less than percent weight loss of the same polysiloxane dry film coating over the same defined time period, but without having said hollow styrene resin microspheres present in the polysiloxane composition.

2. The coating composition of claim 1 wherein the styrene resin hollow microspheres are selected from the group consisting of polystyrene, poly-a-methylstyrene, and styrene-acrylic copolymer resins.

3. The coating composition of claim 2 wherein the styrene resin hollow microspheres are selected from styrene-acrylic copolymer resins.

* * * * *